No. 887,552. PATENTED MAY 12, 1908.
J. VENO
TONGS.
APPLICATION FILED SEPT. 10, 1907.
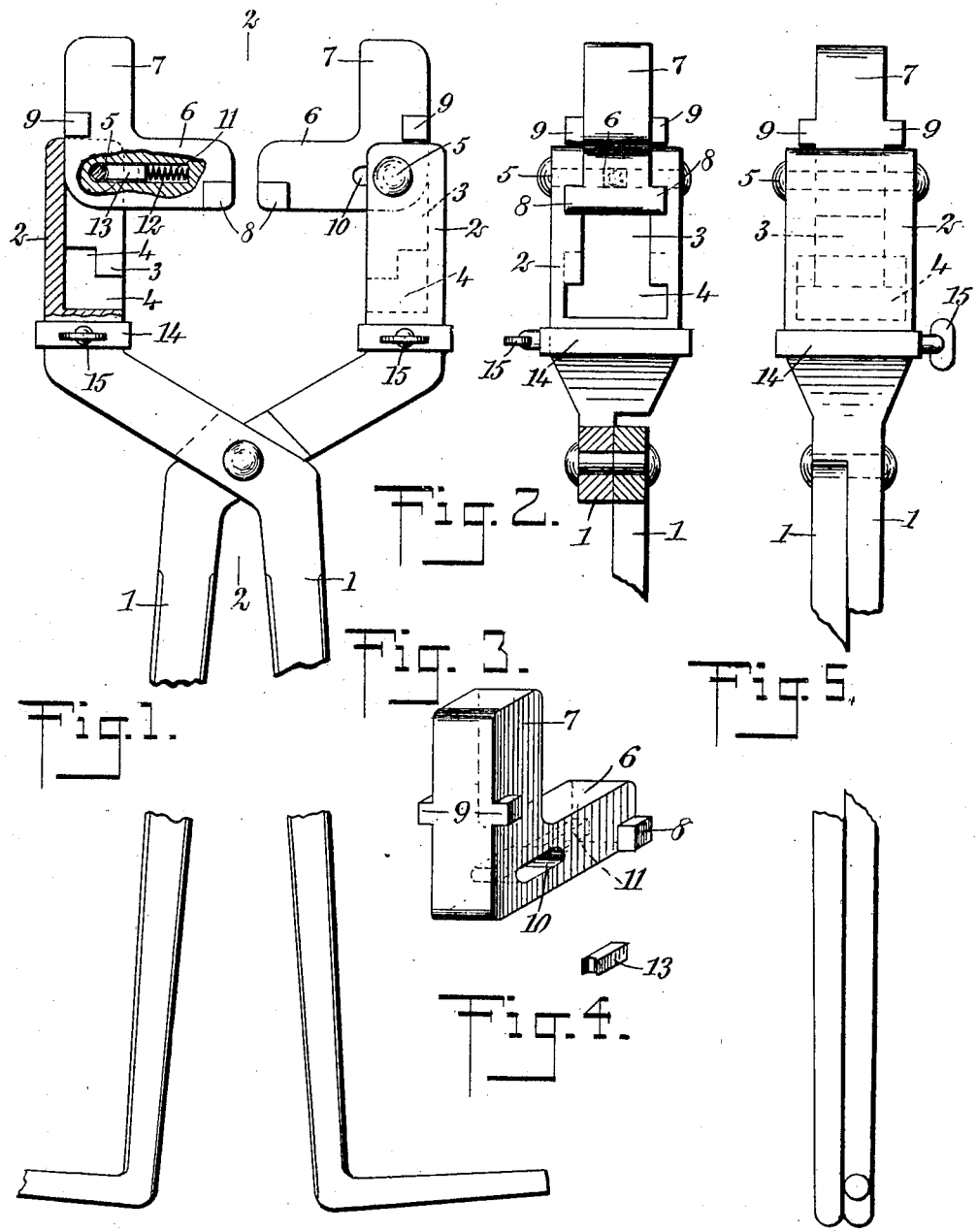
WITNESSES
INVENTOR
James Veno
BY
ATTORNEYS

UNITED STATES PATENT OFFICE.

JAMES VENO, OF WINNIPEG, MANITOBA, CANADA.

TONGS.

No. 887,552.   Specification of Letters Patent.   Patented May 12, 1908.

Application filed September 10, 1907. Serial No. 392,189.

*To all whom it may concern:*

Be it known that I, JAMES VENO, a citizen of the Dominion of Canada, and a resident of Winnipeg, in the Province of Manitoba and Dominion of Canada, have invented a new and Improved Tongs, of which the following is a full, clear, and exact description.

The invention is an improvement in tongs and has for objects among others, to provide a tool of this nature which will grasp and hold articles of greater dimensions and which may be used in smaller spaces than is possible with tongs of like weight and of the usual design. These objects and others I attain by my invention, one embodiment of which is hereinafter disclosed.

Reference is to be had to the accompanying drawings forming a part of this specification, in which similar characters of reference indicate corresponding parts in all the figures.

Figure 1 is a side view, partly in section, of a pair of tongs constructed in accordance with my invention; Fig. 2 is a section of the same substantially on the line 2—2 of Fig. 1; Fig. 3 is a perspective view of one of the angular jaws; Fig. 4 is a perspective view of a block or pin, one of which is spring pressed and slidably mounted in each jaw; and Fig. 5 is an edge view of the tongs.

In the construction of the tongs the usual cross and pivotally connected handle members 1, 1 are employed, the same being extended beyond the pivot to provide bars 2 which are disposed in approximate parallelism. The inner faces of these bars are provided with slots 3 which are formed at their inner ends with undercut enlargements 4. Near the outer end of each bar 2 within the slot 3 is pivotally mounted on a pin or rivet 5, an L-shaped or angular jaw composed of arms 6 and 7, each arm being provided with projecting lugs 8 and 9 arranged at opposite sides.

The aperture within each jaw for receiving its respective pivot pin 5 is in the nature of a slot 10, as best shown in Fig. 3, which runs in the direction of the arm 6, and is provided at its end removed from the pivot pin, with an extension in the form of an inclosed recess 11, the latter providing for the reception of a spring 12, which presses a block or pin 13 shown in detail in Fig. 4, into contact with the pivot pin 5, and thus operates to normally retain said pin at the outer extreme end of the slot 10.

When the angular jaws are disposed in the position illustrated in Fig. 1, the lugs 9 contact with the forward ends of the bars 2 and prevent any further pivotal movement of the jaws in an outward direction. In grasping an article with the jaws in this position, contact is made therewith by the front faces of the arms 6, causing the jaws to revolve about their pivots until the lugs 8 enter the enlargements 4 of the slots 3 and the arms 7 brought to active position. On now drawing on the article, the springs 12 are compressed, permitting the jaws to slide forward and carry the lugs 8 into the undercut portion of the enlargements 4, the lugs 9 during this movement of the jaws passing over the top of the bars 2, the jaws being thus securely locked against further pivotal movement with the article tightly grasped between the arms 7. In this operation of the tool in picking up an object it is apparent that it is unnecessary to separate the jaws to the extent required in the use of tongs of the ordinary design, since the ends of the arm 7 as they revolve and engage the object are separated only the thickness of the object between the points engaged, whereas in tongs of the usual construction the jaws must be separated a greater distance in order that the object may be easily passed between them.

Should it be desired to use the tongs in the ordinary manner, the arms 6 are locked within the slots 3 by bands 14 which are slidably carried on the bars 2, each band being provided with a thumb-screw 15 for fastening it in place.

Inasmuch as the arms 6 may be wholly contained within the slots 3, it is apparent that when they are moved therein, the bands 14 may be slipped over them and secured.

The invention as shown and described, although being my preferred practical embodiment of my improved tongs, I nevertheless regard the precise construction as immaterial and consider that I am entitled to such changes as may be made within a fair interpretation of the appended claims.

Having thus described my invention I claim as new and desire to secure by Letters Patent:

1. In a tool of the character described, jaws each comprising arms arranged at an angle to each other, and means adapting the opposed arms of said jaws to revolve and carry the other arms thereof into active position when the tool is applied to the work.

2. In a tool of the character described, pivoted handle members each being extended to provide a bar having a slotted inner face, jaws pivoted within the slots of each bar, said jaw comprising arms arranged at an angle to each other, and means adapting the opposed arms of said jaws to revolve within said slots and carry the other arms thereof into active position when the tool is applied to the work.

3. In a tool of the character described, pivoted handle members each carrying an angular jaw pivotally and slidably connected thereto and having the substantially horizontal arm of each jaw normally projecting outwardly.

4. In a tool of the character described, pivoted handle members each having a bar slotted on its inner face, angular jaws pivoted within the slots of said bars, each comprising arms, and bands slidable on said bars, each being adapted to be slid over an arm of each jaw when the arms are confined within the slots of said bars, and lock said jaws to the bars.

5. In a tool of the character described, pivotally connected handle members each having a bar provided with a slot on its inner face formed with an undercut enlargement at one end, an angular jaw pivotally mounted within the slot of each bar, having a slot formed therein adjacent to its pivot, a spring-pressed pin within the slot of the jaw in contact with said pivot, and lugs formed on said jaws adapted to enter the undercut enlargements in the slots of said bars.

6. In a tool of the character described, pivotally connected handle members each having a bar provided with a slot on its inner face formed with an undercut enlargement at one end, an angular jaw pivotally mounted within the slot of each bar, having a slot formed therein adjacent to its pivot, a spring-pressed pin within the slot of the jaw in contact with said pivot, lugs formed on said jaws adapted to enter the undercut enlargements in the slots of said bars, and bands carried on said bars for securing the jaws within the slots thereof.

7. In a tool of the character described, pivoted handle members, an angular jaw pivotally connected to each handle member, having a slot adjacent to its pivot, and a spring-pressed pin slidable within said slot normally in contact with the pivot.

8. In a tool of the character described, pivoted handle members each having a bar provided with a slot in its inner face, an angular jaw pivoted within the slot of each bar, having a slot adjacent to its pivot, and a spring-pressed pin slidable within said slot, normally in contact with said pivot.

In testimony whereof I have signed my name to this specification in the presence of two subscribing witnesses.

JAMES VENO.

Witnesses:
M. A. MACQUEEN,
W. N. KENNEDY.